(12) United States Patent
Haupt et al.

(10) Patent No.: US 7,731,002 B2
(45) Date of Patent: Jun. 8, 2010

(54) DISC BRAKE

(75) Inventors: Manfred Haupt, Höhr-Grenzhausen (DE); Michael Schog, Mertloch (DE); Dirk Hees, Mayen-Kürrenberg (DE)

(73) Assignee: Lucas Automotive GmbH (DE)

( * ) Notice: Subject to any disclaimer, the term of this patent is extended or adjusted under 35 U.S.C. 154(b) by 384 days.

(21) Appl. No.: 11/588,882

(22) Filed: Oct. 27, 2006

(65) Prior Publication Data

US 2007/0056812 A1   Mar. 15, 2007

(51) Int. Cl.
*F16D 55/227* (2006.01)
(52) U.S. Cl. .................... 188/73.45; 188/73.43
(58) Field of Classification Search ........... 188/73.1, 188/73.31, 73.45, 73.43, 73.44
See application file for complete search history.

(56) References Cited

U.S. PATENT DOCUMENTS

| 3,298,468 | A |   | 1/1967 | Buyze |   |
|---|---|---|---|---|---|
| 3,915,263 | A | * | 10/1975 | Courbot | 188/73.43 |
| 4,219,106 | A |   | 8/1980 | Lüpertz et al. |   |
| 4,244,451 | A | * | 1/1981 | Johannesen | 188/73.45 |
| 4,465,163 | A | * | 8/1984 | Matsumoto | 188/73.45 |
| 5,067,595 | A | * | 11/1991 | Weiler et al. | 188/73.45 |
| 5,727,659 | A | * | 3/1998 | Brown et al. | 188/73.45 |
| 5,810,121 | A | * | 9/1998 | Anger et al. | 188/73.45 |
| 5,860,496 | A |   | 1/1999 | Kullman et al. |   |
| 6,062,349 | A |   | 5/2000 | Boisseau et al. |   |
| 7,201,258 | B2 | * | 4/2007 | Schog et al. | 188/73.45 |
| 7,216,745 | B2 | * | 5/2007 | Baylis | 188/73.31 |
| 7,431,132 | B2 | * | 10/2008 | Schog et al. | 188/73.45 |
| 2004/0154885 | A1 | * | 8/2004 | Gotti et al. | 188/73.39 |
| 2006/0060431 | A1 |   | 3/2006 | Schog et al. |   |

FOREIGN PATENT DOCUMENTS

| DE | 1 238 284 | 4/1967 |
| DE | 1 505 491 | 9/1969 |
| DE | 1 575 920 | 1/1970 |
| DE | 28 45 404 A1 | 5/1979 |
| DE | 28 04 808 A1 | 8/1979 |
| DE | 29 31 216 A1 | 3/1981 |
| DE | 33 34 676 A1 | 4/1985 |
| DE | 41 15 064 A1 | 12/1992 |
| DE | 44 16 815 A1 | 11/1995 |
| DE | 196 52 936 A1 | 6/1998 |

(Continued)

*Primary Examiner*—Thomas J Williams
(74) *Attorney, Agent, or Firm*—McMillan, Sobanski & Todd, LLC

(57) ABSTRACT

The invention relates to a disc brake having a brake carrier which is fastenable to a vehicle frame and provided with studs for guiding at least one brake lining axially with respect to a brake disc, wherein the brake lining includes U-shaped recesses for the studs into which the studs engage, and wherein during braking tensile forces and/or compressive forces are exerted upon inner surfaces of the recesses. The invention is characterized in that an inner surface of at least one of the U-shaped recesses, which surface bears against a respective stud during a brake actuation, is angled with respect to a central plane of the brake lining such that a force that arises between the said surface and the respective stud during braking presses the brake lining into a stable position with respect to the studs. The invention also relates to a brake lining for use in such a disc brake.

15 Claims, 6 Drawing Sheets

FOREIGN PATENT DOCUMENTS

| | | |
|---|---|---|
| DE | 103 12 478 A1 | 10/2004 |
| GB | 2004008 A * | 3/1979 |
| WO | WO 9015266 A1 * | 12/1990 |
| WO | WO 9857073 A1 * | 12/1998 |
| WO | WO 2004/010020 A1 | 1/2004 |

* cited by examiner

DISC BRAKE

CROSS-REFERENCE TO RELATED APPLICATIONS

This application is a national stage of International Application No. PCT/EP2005/004305 filed Apr. 21, 2005, the disclosures of which are incorporated herein by reference in entirety, and which claimed priority to German Patent Application No. 10 2004 021 126.4 filed Apr. 29, 2004.

BACKGROUND OF THE INVENTION

The invention relates to a disc brake having a brake carrier that is fastenable to a vehicle, the brake carrier including studs for guiding a brake lining axially with respect to a brake disc, wherein during braking the brake lining exerts tensile forces and/or compressive forces upon the studs.

Brakes of this type are generally known. Usually the brake linings, comprising supporting plate and friction lining, are guided axially in relation to the brake disc by means of studs fastened to the brake carrier. "Axially" in the case of disc brakes generally means: in a direction parallel to the axis of rotation of the brake disc. "Radially" accordingly means a direction at right angles to an axial direction in the above sense.

The state of the art of such disc brakes is represented e.g. by the following patent documents: DE 1 238 284, DE 1 505 491, and corresponding U.S. Pat. No. 3,298,468, both of which are incorporated herein by reference in entirety, DE 1 575 920, DE 2 804 808, and corresponding U.S. Pat. No. 4,219,106, both of which are incorporated herein by reference in entirety, DE 2 845 404, DE 196 52 936, DE 41 15 064 and DE 4 416 815.

A constant technical problem in the design of disc brakes is a reduction of the manufacturing cost and the weight of the brake while simultaneously achieving a high operational reliability and a low maintenance cost. The two last-mentioned objectives in particular also entail the prevention of fault susceptibility of the brake due to rust. A particular problem affecting all brake constructions is the avoidance of screeching noises caused by vibrations.

BRIEF SUMMARY OF THE INVENTION

The present invention is also directed towards these technical objectives.

The disc brake according to the invention includes in a known manner a brake carrier, which is fastenable to the vehicle frame and provided with studs for guiding at least one brake lining axially with respect to a brake disc, wherein the brake lining includes mountings for the studs into which the studs engage, wherein the brake lining during braking exerts tensile forces and/or compressive forces on the studs at inner surfaces of the mountings. The above-mentioned technical objectives are achieved according to the invention in that an inner surface of at least one of the mountings, which surface bears against the stud for the exertion of the tensile or compressive forces during a brake actuation, is inclined with respect to a central plane of the brake such that a component of the force acting on the said surface presses the brake lining into a stable position with respect to the stud.

Preferred developments of the invention are described in the dependent claims.

In particular, a preferred embodiment of the disc brake provides that the relative dimensions and configurations of the studs and the brake lining are such that, upon introduction of a braking force that can decelerate the vehicle by up to about 0.1 g, only tensile forces act upon the brake lining, which are received from the run-in stud. When a braking force is introduced above a deceleration of 0.1 g, compressive forces also act on the brake lining, which are then received from the run-out stud.

A preferred embodiment of the disc brake provides that the mountings are U-shaped recesses. With the U-shaped recess, the brake linings encompass the associated studs, and are movably guided on same axially with respect to the brake disc.

With the above-described embodiments of the invention, it is preferably provided that the brake linings exhibit only line contact in the U-shaped recesses with the respective associated studs of the brake carriers. The supporting contact areas of the brake linings on the retaining studs are therefore to be preferably as small as possible, which is to be expressed by the term "line contact".

Another embodiment of the invention provides that the studs, which support the brake linings, are made from a different material to the brake carrier. As a material for the studs, a highly rust-resistant material comes into particular consideration, such as e.g. the materials having the designation 42CrMoS4V, material no. 1.7227, or 17 CrNiMo 6, material no. 1.6587; the indicated material numbers relate to the DIN, German industrial standard. The studs for supporting the brake linings may also be coated with a corrosion protection. Also, a coating may be provided to ensure the displaceability of the brake linings in the long-term, even under chemically aggressive conditions such as e.g. road-salt or the like. These studs may also be manufactured from high-quality screw steel, which is corrosion-protected.

Another embodiment of the invention provides that the disc brake includes in a known manner a brake carrier, which is fastenable to the vehicle frame and provided with studs for guiding a brake lining axially with respect to a brake disc, wherein the brake lining includes U-shaped recesses for the studs into which the studs engage, and wherein during braking tensile forces and/or compressive forces are transferred from inner surfaces of the recesses. The technical objectives are achieved according to the invention in that an inner surface of at least one of the U-shaped recesses, which surface bears against one of the studs during a brake actuation, extends at an angle with respect to a central plane (or a plane of symmetry) of the brake lining. The said surface is so provided that the force, which arises between this surface and the corresponding stud during braking, presses the brake lining into a stable position with respect to the stud. In this connection, this force has a radially inwardly directed component with regard to the brake disc axis.

The invention also relates to a brake lining for use in a disc brake, which supports the brake lining on two studs, wherein the brake lining includes mountings for these studs, into which the studs engage and against whose inner surfaces tensile forces and/or compressive forces are exerted during braking. The technical objectives are achieved according to the invention in that an inner surface of at least one of the mountings, which surface bears against a respective one of the studs during a brake actuation, runs at an angle with respect to a central plane (or a plane of symmetry) of the brake lining. The said inner surface of the mounting is disposed at an acute angle with the said plane. The angle may lie between 0.5° and 10°, preferably lies between 2° and 8°, and more preferably between 3° and 6°. In the embodiment, the angle is about 4°.

As already described, the configuration of the said surface and the corresponding stud leads to the result that the force, which is generated between this surface and the stud during braking, presses the brake lining into a stable position with respect to the studs. In this connection, the force has an approximately radially inwardly directed component with regard to the brake disc axis.

Further preferred forms of the invention are indicated in the dependent claims and in the following description of embodiments.

Other advantages of this invention will become apparent to those skilled in the art from the following detailed description of the preferred embodiments, when read in light of the accompanying drawings.

In the following figures, embodiments are shown in which components that are identical or similar in function to one another are denoted by the same reference characters.

DETAILED DESCRIPTION OF THE INVENTION

Figure 1:
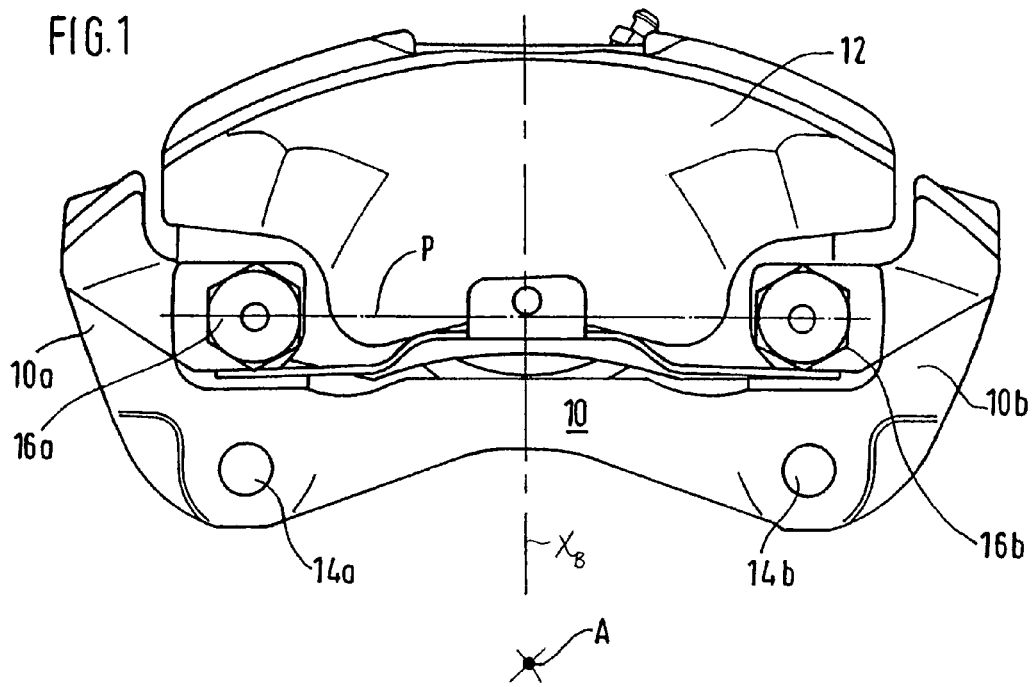
FIG. 1 a disc brake in front view, viewed in the assembled state from the vehicle outer side.

As is presented in particular in FIGS. 1, 2, 5, 6, a brake carrier 10 has two arms 10a, 10b. Disposed above the brake carrier 10 is a floating caliper 12, which in the illustrated embodiments is designed as a two-piece arrangement. The floating caliper 12 comprises, in relation to the vehicle, an inner portion 12a and an outer portion 12b. The portions 12a, 12b are firmly connected to one another by screws 26a, 26b, 26c, 26d (cf. FIGS. 2 and 7). The brake carrier 10 is rigidly fastened to the vehicle in a conventional manner, for which purpose holes 14a, 14b and screws (not shown) are used.

As in particular FIG. 6 and FIGS. 1, 3, 4, 5 show, threaded studs 16a, 16b, 18a, 18b are firmly connected to the brake carrier 10. The said threaded studs are provided over part of their longitudinal extent with an external thread, which is screwed into a matching internal thread in the brake carrier 10. The portions of the threaded stud that are exposed in FIG. 6 (i.e. the portions not concealed by the brake carrier in FIG. 6) are thread-free. These thread-free portions of the threaded studs 16a, 16b, 18a, 18b are used to support the brake linings, as is described in more detail further below. The studs of the threaded studs, on which the brake linings are supported, are circular-cylindrical in shape.

Figure 3:
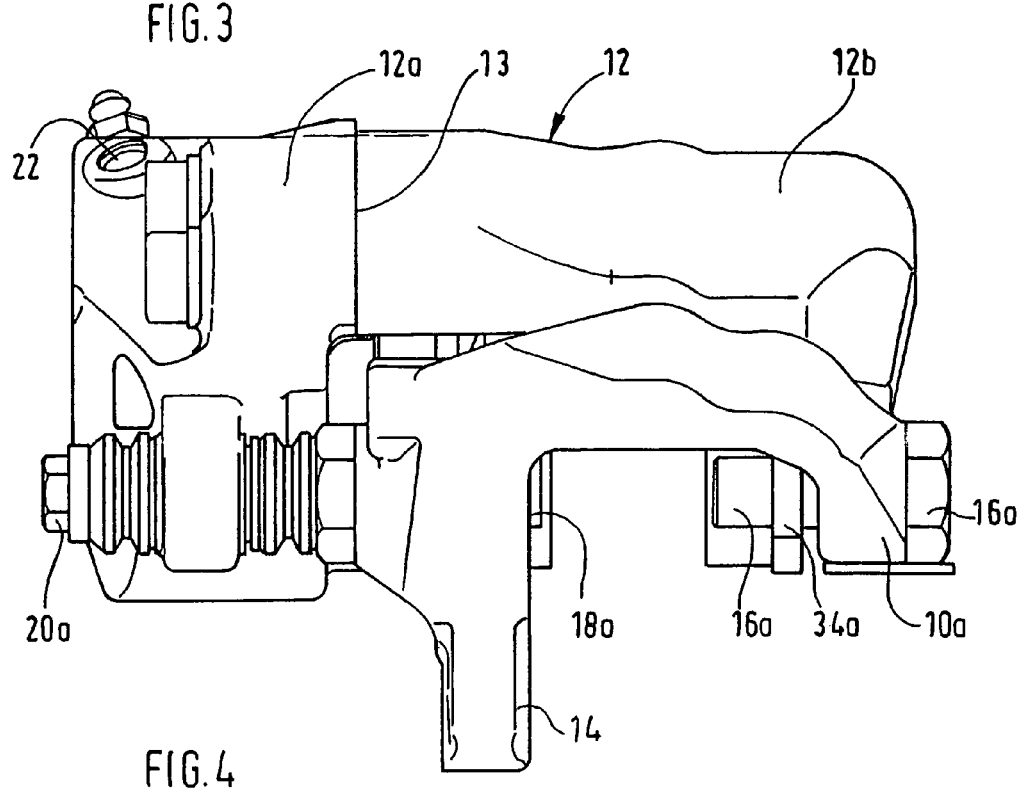
FIG. 3 the disc brake according to FIGS. 1 and 2 in side view.
Figure 4:
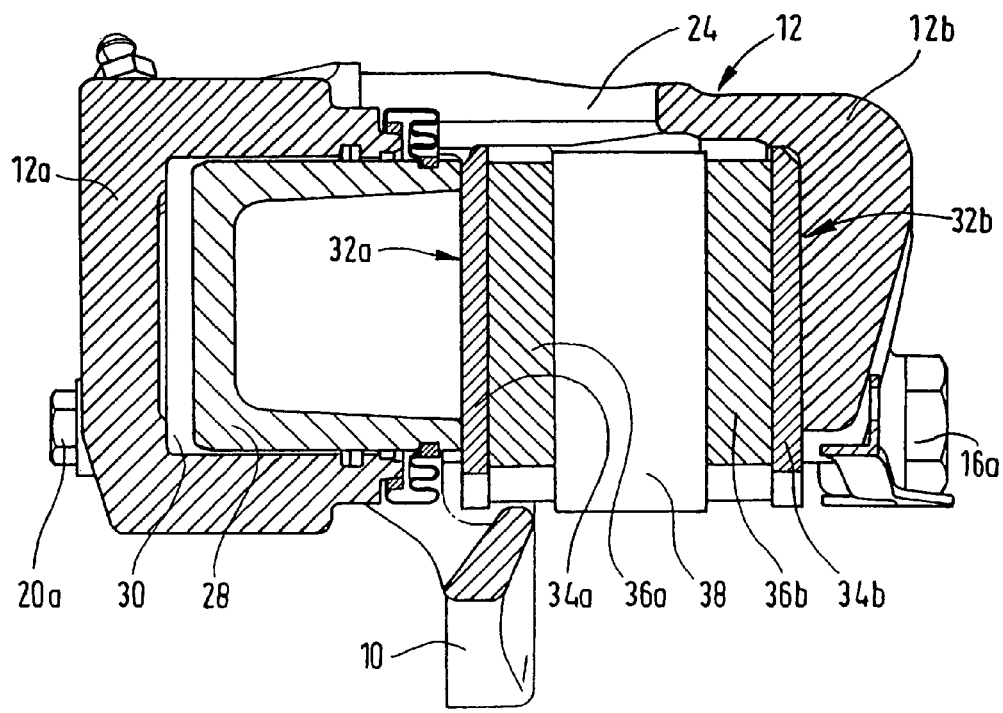
FIG. 4 the disc brake according to FIG. 3 in section.
Figure 7:
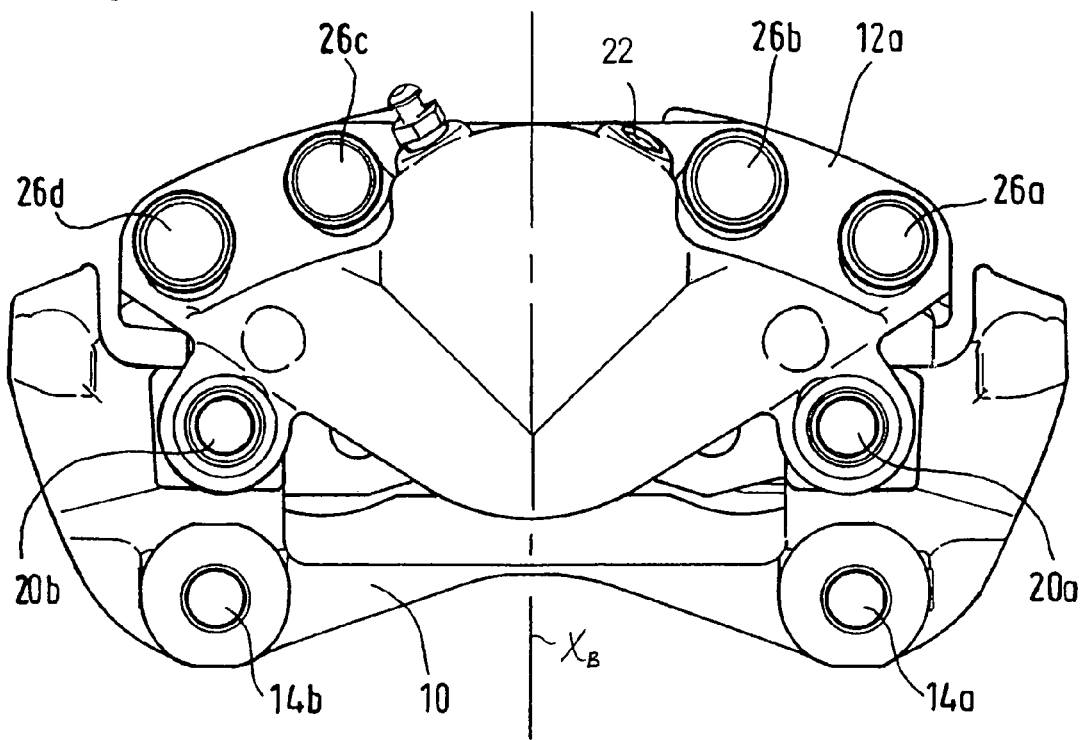
FIG. 7 the disc brake according to FIGS. 1 to 3 in rear view, seen in the assembled state from the vehicle inner side.

As is evident in particular from FIGS. 3, 4, 7, the floating caliper 12 slides along guide bushes, which are coaxially secured by means of screws 20a, 20b into the threaded studs 18a, 18b situated at the vehicle-inner side. For this, the threaded studs 18a, 18b are provided centrally with an internal thread, into which an external thread of the screws 20a, 20b is screwable in each case. Thus, the screw 20a and the threaded stud 18a, as well as the screw 20b and the threaded stud 18b, are in each case coaxial with one another (cf. FIG. 3). Similarly, the threaded studs 16a, 18a and the threaded studs 16b, 18b (FIG. 6) are also coaxial.

Figure 2:
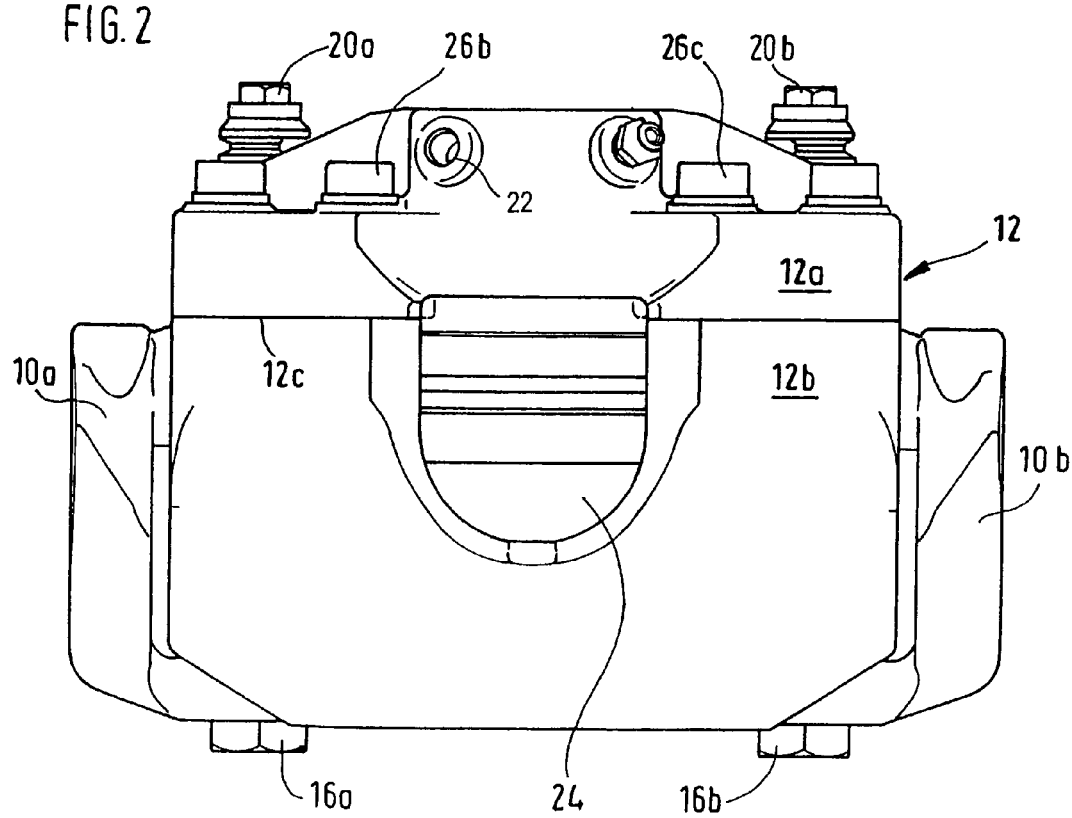
FIG. 2 the disc brake according to FIG. 1 in plan view.

According to FIGS. 2 and 7, the two caliper portions 12a, 12b are firmly connected to one another by means of screws 26a, 26b, 26c, 26d. The attachment surface of the two caliper portions 12a, 12b is denoted by 12c in FIG. 2.

Brake fluid for moving the piston 28 is introduced in conventional manner via a fluid inlet 22 into an actuation cylinder 30 (cf. FIG. 4). Thus, when the fluid pressure in the actuation cylinder 30 is increased, the piston 28 moves in FIG. 4 to the right and the floating caliper 12 moves correspondingly to the left.

Figure 8:
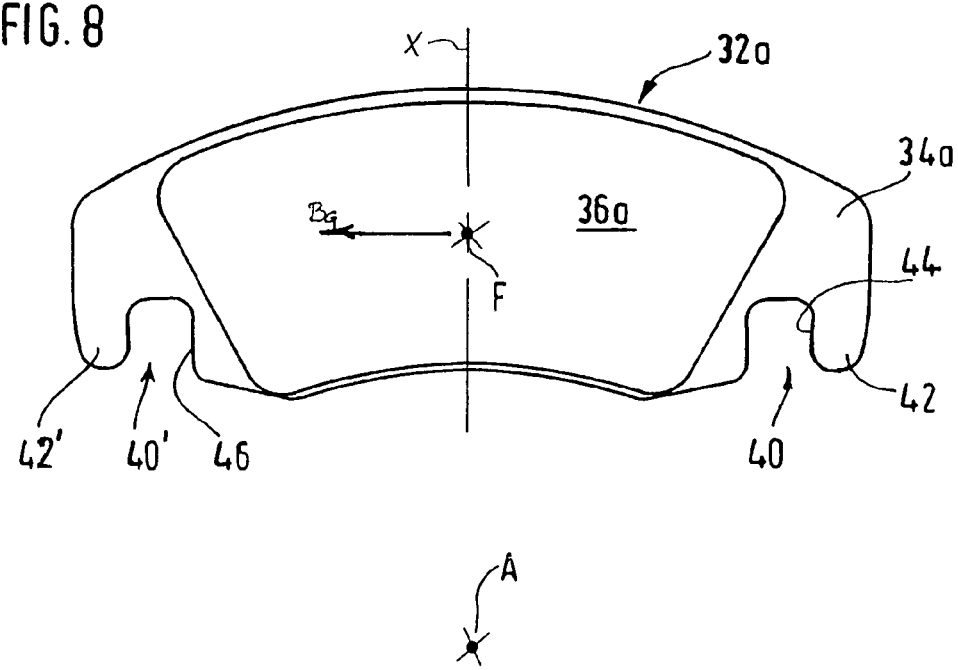
FIG. 8 a brake lining for use in a disc brake according to FIGS. 1 to 7.

FIG. 8 shows one (32a) of the two identically constructed brake linings 32a, 32b (cf. also FIG. 4). The brake lining 32a comprises a supporting plate 34a (made of metal) and a friction lining 36a. The friction lining 36a wears as a result of friction during braking. FIG. 8 also shows the centre of area F of the friction lining 32a. The brake lining at the run-in side and at the run-out side of the brake has in each case a U-shaped recess 40, 40'. Also, FIG. 8 diagrammatically illustrates the axis of rotation A of the brake disc 38 (latter not shown in FIG. 8, cf. FIG. 4).

The brake linings 32a, 32b are mounted by their U-shaped recesses 40, 40' from above onto the thread-free portions of the threaded studs 16a, 16b and/or 18a, 18b. This leads to line contact between a wall in the recesses 40, 40' and the surface of the respective stud 16a, 16b, 18a, 18b.

Figure 5:
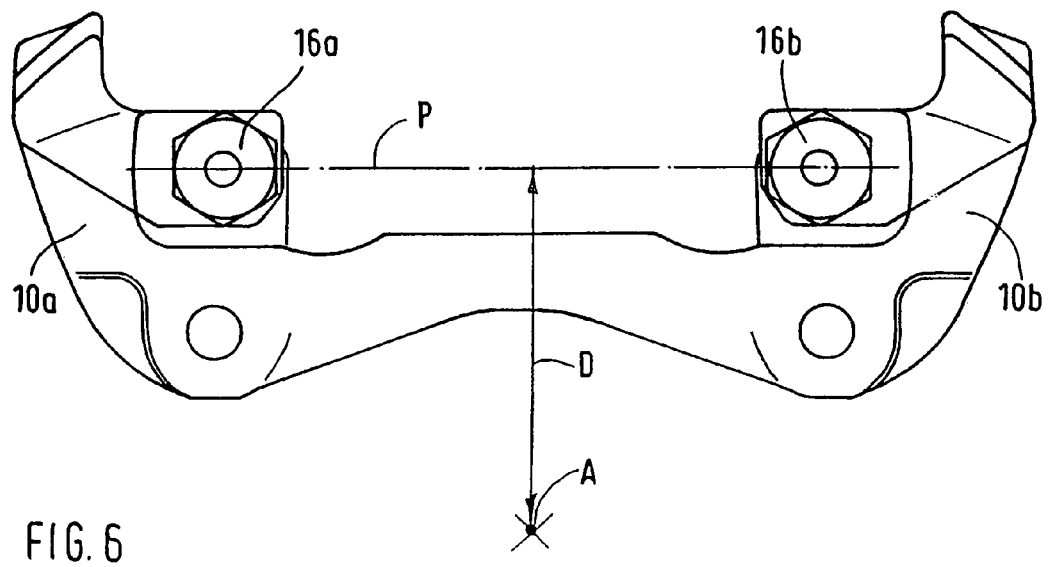
FIG. 5 the brake carrier in front view.
Figure 6:
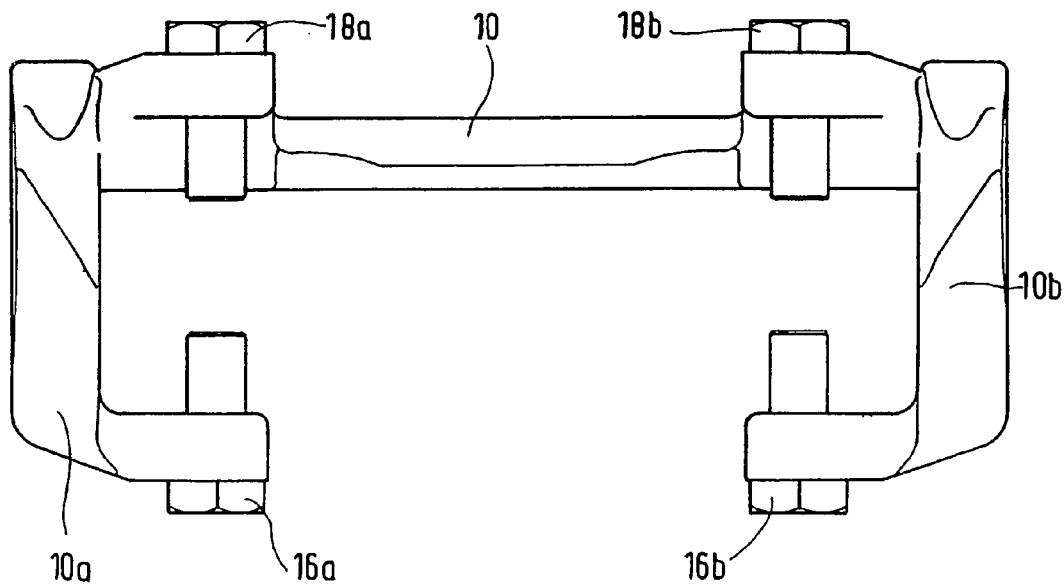
FIG. 6 the brake carrier in plan view.

The plane, which is spanned through the longitudinal axes of the threaded studs 16a, 16b, 18a, 18b, is designated with P in FIGS. 1 and 5. The position of the axis A of the brake disc is also schematically shown in FIG. 5. This axis A extends perpendicular to the plane of the drawing.

The said dimensions of the brake components are moreover selected in such a way that, upon introduction of a braking force capable of decelerating the vehicle by approximately 0.1 g, only tensile forces act upon the brake linings. When in FIG. 8 the brake disc rotates in an anti-clockwise direction about the axis A, the run-in side of the brake lies on the right, i.e. corresponding to the recess 40, while the run-out side of the brake lies on the left, corresponding to the recess 40'. Thus, given braking forces, which under conditions of good frictional engagement between tyre and road do not exceed the said maximum vehicle deceleration of about 0.1 g, only tensile forces arise at the brake lining 32a, i.e. at the run-in side, FIG. 8; the braking forces are taken up on the right by the run-in-side surface 44 of the lobe 42 of the brake lining. The braking frictional forces act leftwards in FIG. 8 and are denoted as the braking force $B_G$ acting through the centre of area F. Only when a braking force $B_G$ above a deceleration of 0.1 g is introduced does the surface 46 of the brake lining bear against the associated stud in the recess 40' at the run-out side of the brake. Then the braking force $B_G$ acts as tensile force at the surface 44 and as compressive force at the surface 46.

The dimensions of the brake may also be selected in such a way that the brake linings 32a, 32b, upon transmission of a braking force that results from a hydraulic brake pressure of up to approximately 10 bar and corresponding to a vehicle deceleration of up to approximately 1 m/s$^2$, have only the described tensile forces effective at the brake lining, whereas given hydraulic brake pressures of more than 30 bar, corresponding to a vehicle deceleration of more than 3 m/s$^2$, both tensile forces and considerable compressive forces (as described above) act upon the brake linings from the studs. In the transition range between 10 and 30 bar a slowly increasing load distribution from both studs occurs. Thereby, the brake carrier can be constructed lightly (with low weight). Higher tangential forces are favourably distributed to both carrier arms.

The previously noted force transfers through tension and compression are preferably selected for the brake lining at the outer side of the vehicle. For the brake lining disposed at the vehicle-inner side, the dimensions may also be so selected, although this brake lining is preferably predominantly under tension.

The FIGS. 9, 10, 11 and 12 show details of the above-mentioned force transfers through tension and compression within the recesses 40, 40' of the vehicle outer-side brake lining 32a during braking.

Figure 9:
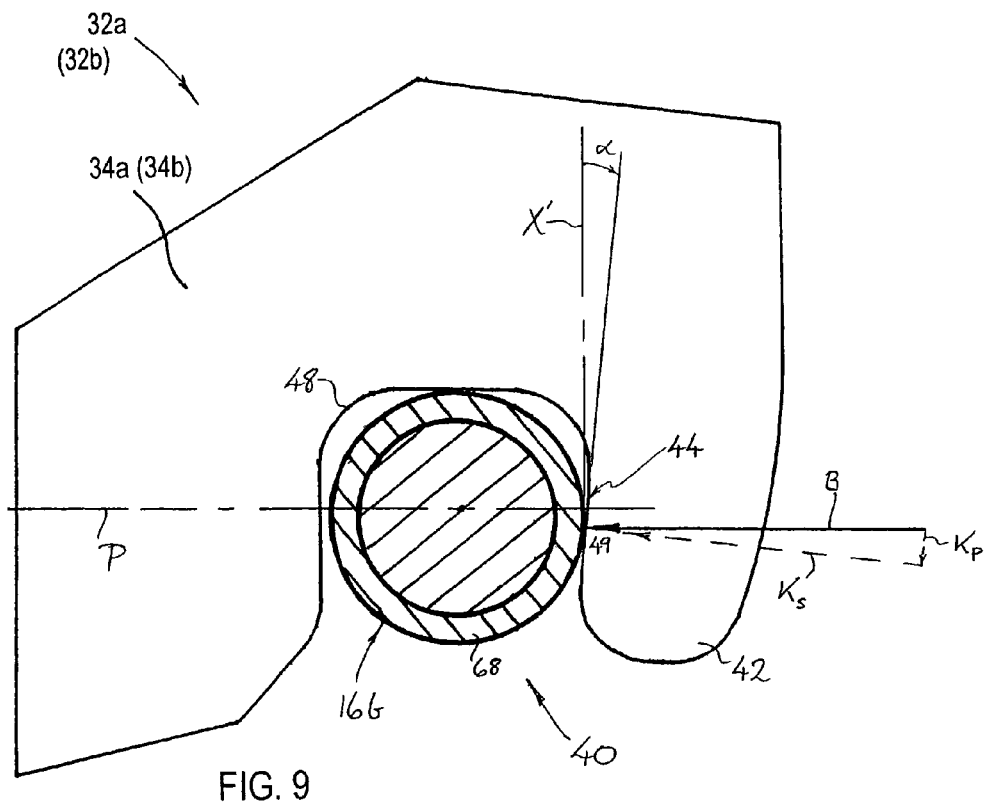
FIG. 9 course of the action forces at the run-in side of the brake lining.

FIG. 9 shows the recess 40 arranged at the run-in side of the brake, the inner surface 44 of which bears against the stud 16b during a brake actuation. The braking force B which is transferred to the stud 16b is for lower decelerations the braking force $B_g$ as such, for higher decelerations a portion of the total braking force $B_G$.

In the FIGS. 8 to 12 it is assumed that the brake disc rotates anti-clockwise. The brake lining therefore experiences a force that, in the Figures, is directed to the left. This relates to a braking during forward travel of the vehicle. During reverse travel the force vectors are oppositely directed. The inner surface 44 according to FIG. 9, at which during braking in the course of forward travel the braking forces are absorbed as tensile forces, is essentially flat and contacts the cylindrical stud 16b along a line. This is identified with 49 in FIGS. 9 and 11.

FIG. 8 shows a plane of symmetry X, which represents a central plane with regard the brake lining 32a, 32b. This central plane X of the brake lining 32a corresponds also to the plane of symmetry $X_B$ of the disc brake (cf. FIGS. 1 and 7). The run-in side and the run-out side of the brake are reflected across this plane X of the brake lining 32a. Both the axis A of the brake disc as well as the centre of area F of the brake lining lie on this plane of symmetry X.

The FIGS. 9 to 12 show the planes X' and X", which extend parallel to the central plane of symmetry X according to FIG. 8.

As is to be gathered from FIG. 9, the inner surface 44 in the recess 40 forms an acute angle $\alpha$ with the plane X', and correspondingly also with the plane X parallel to the plane X'. The angle $\alpha$ may lie between 0.5° and 10°, preferably it lies between 2° and 8°, and more preferably between 3° and 6°. In this embodiment, the angle amounts to approximately 4°.

The line of contact 49 between the stud 16b and the lobe 42 on the brake lining 32a extends, as shown in FIG. 9, radially inwardly of the plane P that spans the central axis of the studs.

FIG. 9 shows the braking force B, which is transferred to the stud 16b. The braking force B can be resolved into a parallelogram of forces having a component $K_S$ which extends perpendicular to the surface 44 and a component $K_P$ which runs parallel to the surface 44. The force component $K_S$ extending perpendicular to the surface 44 effects no relative displacement between the brake lining 32a and the stud 16b. However, the force component $K_P$ running parallel to the surface 44 effects a relative force between brake lining 32a and stud 16b that causes the brake lining 32a in the illustrated embodiment according to FIG. 9 to be pressed downwardly, approaching radially inwardly, into a stable position. The brake lining 32a is pressed with its recess 40 onto the stud 16b. A stable positioning of the brake lining 32a with respect to the stud 16b is thereby achieved.

Figure 11:
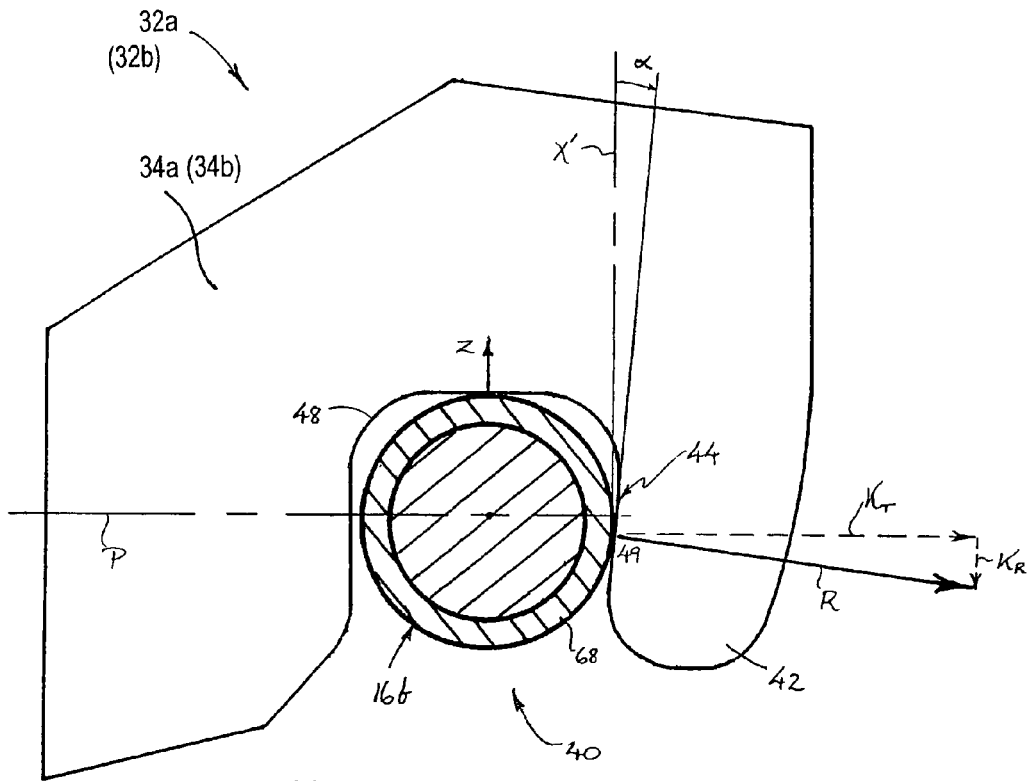
FIG. 11 course of the reaction forces at the run-in side of the brake lining.

FIG. 11 shows the reaction forces in the U-shaped recess 40, wherein a stable positioning of the brake lining 32a with respect to the stud 16b is attained.

FIG. 11 shows the recess 40 arranged at the run-in side of the brake (cf. FIG. 9), at the inner surface 44 of which the reaction force R is generated in cooperation with the stud 16b. The reaction force R is the force which arises between the stud 16b and the surface 44 during a braking and extends perpendicular to the surface 44. The reaction force R, which acts at the line of contact 49 between stud and brake lining, is able to be resolved into a parallelogram of forces having a component $K_T$ which extends perpendicular to the plane X', and a component $K_R$ which is directed radially inwards parallel to the central plane X (and to the similarly parallel plane X' respectively).

The force $K_T$ extending perpendicular to the plane X' is opposite to the direction of the vector B from FIG. 9 and is a tensile force which the stud 16b exerts on the brake lining 32a. The force component $K_R$ between the brake lining 32a and the stud 16b effects that the brake lining 32a in the illustrated embodiment according to FIG. 11 is pressed and held downwards, radially inwardly into a stable position. The brake lining 32a cannot escape from its mounting on the stud 16b and also cannot carry out any undesirable vibrational movements. A stable positioning of the brake lining 32a with respect to the stud 16b is achieved, and indeed also when the centre of area F of the friction lining lies radially above, beyond the plane P which contains the central axes of the studs 16a, 16b, 18a, 18b. In this stable positioning of the brake lining 32a, the base of the recess 40 meets the upper surface of the stud 16b and a reaction force Z that extends parallel to the plane X' is generated there.

Figure 10:
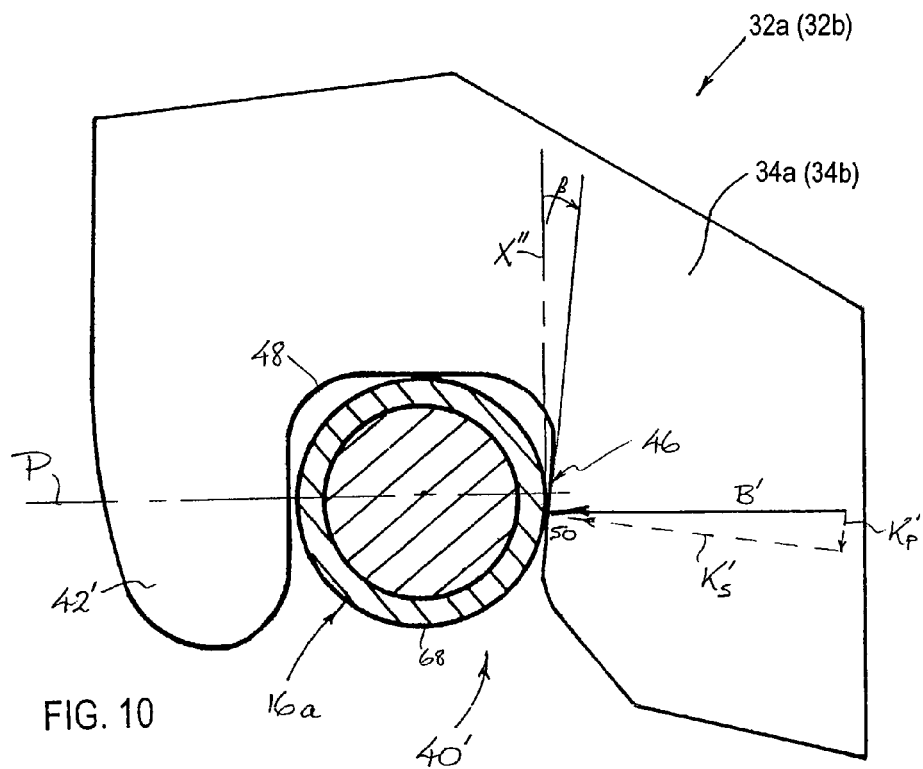
FIG. 10 course of the action forces at the run-out side of the brake lining.
Figure 12:
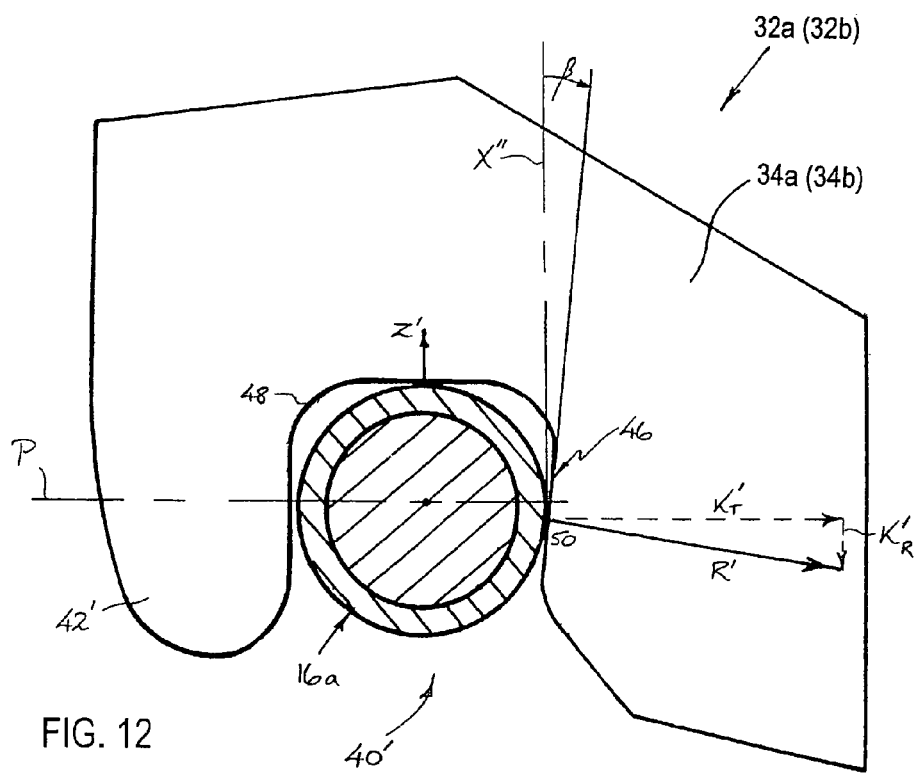
FIG. 12 course of the reaction forces at the run-out side of the brake lining.

In similar fashion, FIGS. 10 and 12 show the force transfer between the brake lining 32a and the stud 16a at the run-out side of the brake, during braking in the forward travel direction. The corresponding components are referenced with the same reference characters, complemented with a dash as appropriate. When higher braking forces are in effect, for example a braking force $B_G$ which effects a deceleration above 0.1 g, then a braking force B' is exerted on the stud 16a and compressive forces are introduced at the run-out side in accordance with FIG. 12.

FIG. 10 shows the recess 40' arranged at the run-out side of the brake, the inner surface 46 of which bears against the stud 16a during a higher braking actuation. The braking force B' which is transferred to the stud 16a is a portion of the total braking force $B_G$. The line of contact 50 between the surface 46 in the recess 40' of the brake lining 32a (cf. FIG. 8) is, analogous to the surface 44, inclined at an angle $\beta$ to a plane X", wherein the plane X" runs parallel to the central plane X.

The braking force B' is also able to be resolved into a parallelogram of forces having a component $K_S'$ which extends perpendicular to the surface 46 and a component $K_P'$ which runs parallel to the surface 46 (cf. FIG. 9). The force component $K_S'$ extending perpendicular to the surface 46 effects no relative movement between the braking lining 32a and the stud 16a. However, the force component $K_P'$ running parallel to the surface 46 effects a relative force between brake lining 32a and stud 16a. This has the effect that the brake lining 32a in the illustrated embodiment according to FIG. 10 is pressed downwardly, approaching radially inwards into a stable position. The brake lining 32a is pressed with its recess 40' onto the stud 16a. A stable positioning of the brake lining 32a with respect to the stud 16a is thereby achieved.

FIG. 12 shows the reaction forces in the U-shaped recess 40', where a stable positioning of the brake lining 32a with respect to the stud 16a is attained.

FIG. 12 shows the recess 40' arranged at the run-out side of the brake (cf. FIG. 10), from whose inner surface 46 in cooperation with the stud 16a from which the reaction force R' is generated. The reaction force R' is the force that arises between the stud 16a and the surface 46 during a braking and extends perpendicular to the surface 46. The reaction force R', which acts at the line of contact 50 between the stud 16a and the brake lining 32a, is able to be resolved into a parallelogram of forces having a force $K_T'$ perpendicular to the plane X", and a force $K_R'$ which runs parallel to the plane X" and the central plane X, respectively. The compressive force, which the stud 16a exerts on the brake lining 32a, is the force component $K_T'$; it extends parallel to the plane P and is in the opposite direction to the force vector B' according to FIG. 10.

The force component $K_R'$ holds the brake lining 32a on the stud 16a in a stable position. The stabilizing force is therefore again essentially radially directed, it generates a radial component with respect to the disc axis A. The angle β has the same preferred dimensions as the above-explained angle α. In this stable position of the brake lining 32a, the base of the recess 40' contacts the outer surface of the stud 16a and effects the reaction force Z' which extends parallel to the plane X".

According to FIG. 8 the U-shaped recesses 40, 40' at their bases include rounded-off transitions between the side faces, wherein the transition radii (cf. reference character 48 in FIGS. 9 and 10) are smaller than the radii of the supporting studs 16a, 16b, 18a, 18b. It is thereby possible to define the lines of contact 49, 50 between the brake lining 32a, 32b and the stud more precisely. The narrow, preferably line contact areas 49, 50 of the studs in the U-shaped recesses 40, 40' enable that any corrosion products are removed owing to the high compressive load per unit area. Vibrations are substantially avoided.

In the embodiments according to the figures, the studs 16a, 16b, 18a, 18b upon which the brake linings 32a, 32b are supported, are of cylindrical form in the supporting regions, respectively. As is to be gathered from the FIGS. 9 and 10, the studs 16a, 16b, 18a, 18b may be provided with a sleeve 68, e.g. a resilient (elastic) sleeve, which may likewise effect an increased damping of vibrations. The sleeve 68 may exhibit corrosion-suppressing and/or dampening characteristics between the brake lining and the stud.

In a modification to the floating-caliper brakes described as embodiments above, the invention may also be realized with a fixed-caliper brake. In this respect, the brake carrier and the studs, as well as the associated features of the brake linings correspond to those of the floating-caliper brake. In the fixed-caliper brake there is merely a different introduction of force into the brake linings. In these embodiments of the invention a particular advantage is observed in that, owing to the tensioned brake linings, all of the piston diameters in a four-piston brake can have the same size. It is not necessary to provide larger piston diameters on the run-out side.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

LIST OF REFERENCE CHARACTERS

10 Brake carrier
10a, 10b Brake carrier arms
12 Floating-caliper
12a, 12b Floating-caliper portions
12c Attachment surface of the floating caliper portions
14a, 14b Holes
16a, 16b Threaded studs for guiding a brake lining
18a, 18b Threaded studs for guiding a brake lining
20a, 20b Screws
22 Fluid inlet
26a, 26b, 16c, 26d Screws
28 Piston
30 Actuation cylinder
32a, 32b Brake linings
34a, 34b Carrier plates of the brake linings
36a, 36b Friction linings of the brake linings
40, 40' U-shaped recesses
42, 42' Lobes of the brake linings
44, 46 Inner contact surfaces of the recesses
48 Transition radii of the recesses
49, 50 Lines of contact
68 Stud sleeve
A Disc axis or rotational axis
P Plane through the longitudinal axes of the studs
$B_G$ Total brake force
B, B' Brake forces at the studs
$K_S$, $K_S'$ Components of the brake forces perpendicular to the contact surfaces
$K_P$, $K_P'$ Components of the brake forces parallel to the contact surfaces
R, R' Reaction forces of the studs at the contact surfaces
$K_T$, $K_T'$ Components of the reaction forces tangential to the disc axis
$K_R$, $K_R'$ Components of the reaction forces radial to the disc axis
$X_B$ Central plane of the disc brake
X Central plane of the brake lining
X', X" Planes that extend parallel to the central plane of the brake lining
Z, Z' Reaction forces of the studs at the base of the recesses

The invention claimed is:

1. A disc brake comprising:
    a brake carrier which is fastenable to a vehicle frame and provided with studs for guiding at least one brake lining axially with respect to a brake disc;
    wherein the brake lining includes U-shaped recesses for the studs into which the studs engage, and the brake lining during braking exerts tensile forces and/or compressive forces via inner surfaces of the U-shaped recesses upon the studs;
    wherein the inner surface in at least one of the U-shaped recesses is provided with flat side faces which are connected to an upper flat base face by rounded off transition radii; and
    wherein one of the flat side surfaces bears against a respective stud during a brake actuation so as to define a line of contact with the respective stud which is inclined at an angle with respect to a central plane of the brake which extends parallel to a central plane of symmetry of the brake lining, such that a component of the force acting at the inner surface presses the brake lining into a stable position with respect to the stud.

2. The disc brake according to claim 1, wherein the angle lies between 1° and 10°.

3. The disc brake according to claim 1, wherein the studs and the associated U-shaped recesses are arranged on a run-in side and on a run-out side of the brake, and that at least the U-shaped recess on the run-in side of the brake is so formed that the component of the force is generated there.

4. The disc brake according to claim 3, wherein the run-in side stud and the U-shaped recess are so arranged with respect to one another that, upon braking in the forward travel direction of the vehicle, tensile forces of the brake lining act from the inner surface to the stud.

5. The disc brake according to claim 1, wherein the relative dimensions and configurations of the studs and of the brake lining are such that, upon introduction of a braking force capable of decelerating the vehicle up to a value of about 0.1 g, only tensile forces act upon the brake lining.

6. The disc brake according to claim 1, wherein the U-shaped recess, from the inner surface of which compressive forces are transferred, is so configured that the reaction force generates a component.

7. The disc brake according to claim 6, wherein, with a braking force that generates a deceleration of more than 0.1 g, compressive forces from the brake lining act upon the run-out side stud.

8. The disc brake according to claim 1, wherein the studs consist of a different material to the brake carrier.

9. The disc brake according to claim 1, wherein the brake is a floating-caliper brake, a floating-frame brake, or a fixed-caliper brake.

10. A disc brake according to claim 1, wherein the U-shaped recesses are opened radially downwardly to enable the brake lining to be mounted radially downwardly from above onto the studs.

11. A disc brake according to claim 1, wherein the line of contact with the respective stud also extends radially inwardly of a plane that spans a central axis of the studs.

12. The disc brake according to claim 1, wherein the angle lies between 2° and 8°.

13. The disc brake according to claim 1, wherein the angle lies between 3° and 6°.

14. The disc brake according to claim 1, wherein the studs are provided with a coating of non-rusting material.

15. A disc brake comprising:
a brake carrier which is fastenable to a vehicle frame and provided with studs for guiding at least one brake lining axially with respect to a brake disc;
wherein the brake lining includes U-shaped recesses for the studs into which the studs engage, and the brake lining during braking exerts tensile forces and/or compressive forces via inner surfaces of the U-shaped recesses upon the studs;
wherein the inner surface in at least one of the U-shaped recesses is provided with flat side faces which are connected to an upper flat base face by rounded off transition radii;
wherein one of the flat side surfaces bears against a respective stud during a brake actuation so as to define a line of contact with the respective stud which is inclined at an angle with respect to a central plane of the brake which extends parallel to a central plane of symmetry of the brake lining, such that a component of the force acting at the inner surface presses the brake lining into a stable position with respect to the stud;
wherein the U-shaped recesses are opened radially downwardly to enable the brake lining to be mounted radially downwardly from above onto the studs; and
wherein the line of contact with the respective stud also extends radially inwardly of a plane that spans a central axis of the studs.

* * * * *

UNITED STATES PATENT AND TRADEMARK OFFICE
CERTIFICATE OF CORRECTION

PATENT NO. : 7,731,002 B2  Page 1 of 1
APPLICATION NO. : 11/588882
DATED : June 8, 2010
INVENTOR(S) : Manfred Haup et al.

It is certified that error appears in the above-identified patent and that said Letters Patent is hereby corrected as shown below:

On the Title Page, Item [30] Foreign Application Priority Data has been omitted.

The following patent information should then be inserted under Item [30]:
--GERMANY 10 2004 021 126.4 04/29/2004
EUROPEAN PATENT OFFICE (EPO) PCT/EP05/04305 04/21/2005--

Signed and Sealed this

Seventeenth Day of August, 2010

David J. Kappos
*Director of the United States Patent and Trademark Office*